Oct. 8, 1940.   R. J. DORN   2,217,434

ANIMAL BALL

Original Filed July 9, 1934

INVENTOR.
RANDOLPH J. DORN
BY
ATTORNEY.

Patented Oct. 8, 1940

2,217,434

UNITED STATES PATENT OFFICE 2,217,434

ANIMAL BALL

Randolph J. Dorn, Sandusky, Ohio, assignor to The Barr Rubber Products Company, Sandusky, Ohio, a corporation of Ohio Continuation of application Serial No. 734,296, July 9, 1934. This application September 8, 1936, Serial No. 99,721

2 Claims. (Cl. 273—58)

This invention relates to a rubber ball or like article and to the improved method by which the ball is produced and constitutes a continuation of my copending application, Serial No. 734,296, filed July 9, 1934.

The ball is constructed especially for animals, particularly dogs, and has the features of long life and lightness so as not to injure the dog's teeth while it is playing with and chewing the ball.

An object of the invention is to provide a ball of the type referred to which has a sponge rubber core providing the necessary flexibility and a cover of harder rubber substantially impervious to the dog's teeth so as to materially lengthen the life of the ball.

Another object of the invention is to provide a ball of this character which is simple and inexpensive to manufacture and of lasting characteristics.

With the objects above indicated and other objects hereinafter explained in view, the invention consists in the structural features of the ball and the method by which it is produced.

Referring to the drawing.

Figure 1:
Figure 1 is a cross-sectional view of a sponge rubber core employed in producing the ultimate ball.

In the drawing there is illustrated more or less diagrammatically apparatus which is employed for carrying out the method of producing the playing ball embodying the present invention.

In Figure 1 is illustrated a core 10 which consists of an especially tough, close grain sponge rubber made up in any desired size and particularly resilient. This core 10 is produced in the usual manner in which solid rubber balls are made and which is well known in the art, the same being formed in a mold and vulcanized by heat action while under pressure. After the core 10 has been thus formed, it is trimmed and tumbled in the usual manner, producing a vulcanized ball having a substantially smooth outer surface. It is this preformed vulcanized sponge rubber core which constitutes the center of the playing ball embodying the present invention.

Figure 2:
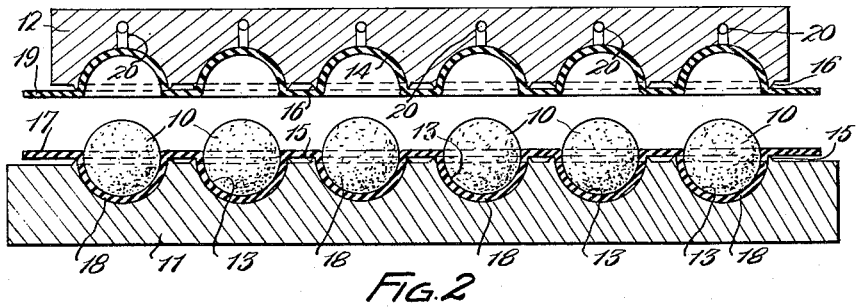
Figure 2 is a sectional view of a portion of a mold for applying the cover to the core.

Separable mold members 11 and 12, relatively movable in any well known manner, are provided with a plurality of cooperating hemispherical recesses 13 and 14 in the adjacent surfaces of the mold members, as clearly shown in Fig. 2. Cooperating knife edges 15 and 16 are also provided upon the adjacent surfaces of the mold members and extend continuously around the inner edges of the hemispherical recesses 13 and 14 for a purpose to be later described. In attaching the cover to the core 10, rubber cover stock is formed in strips and cut to proper lengths, depending, naturally, upon the number of balls the mold members are adapted to handle at a single operation. A strip of this rubber stock 17 is placed upon the lower mold member 11 with portions 18 extending into the recesses 13, and a sponge rubber core 10, which has been previously coated with a suitable cement, is placed in each of the recesses 13 in the lower mold member 11, as clearly shown in Fig. 2.

Figure 3:
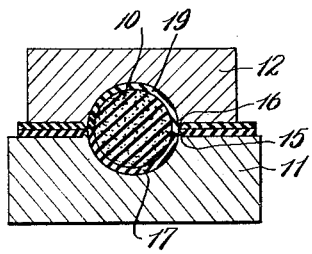
Figure 3 is a cross-sectional view of a mold showing the half sections in cooperating relation.
Figure 4:
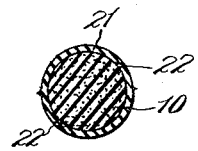
Figure 4 is a cross-sectional view of a ball with the cover attached.

A strip of cover stock 19 is placed against the inner surface of the upper mold member 12, and, by means of suction which communicates with the recesses 14 through openings 20, the cover stock is drawn into these recesses 14, as shown in Fig. 2. With the cover stock and sponge rubber cores so arranged, the mold members 11 and 12 are brought together in any suitable manner, which causes the cover stock 17 and 19 to be pressed around the core 10 in the manner shown in Fig. 3. At the same time the knife edges 15 and 16 cooperate to sever the excess cover stock from the core 10, and when the mold members 11 and 12 are again separated, the core 10 has attached thereto a rubber cover 21, as shown in Fig. 4. During the operation of applying the rubber cover 21 to the core 10, it has been found that air is trapped between the outer surface of the core 10 and the inner surface of the cover 21, this being an undesirable condition inasmuch as it is the purpose of the present invention to provide a rubber cover securely united with the sponge rubber core. A sharp instrument, such as a needle, may be used to pierce the outer cover 21, as shown at 22, in as many places as is required to make certain that the air will escape so that the cover 21 will snugly fit the core 10. Usually only one piercing is necessary.

Figure 5:
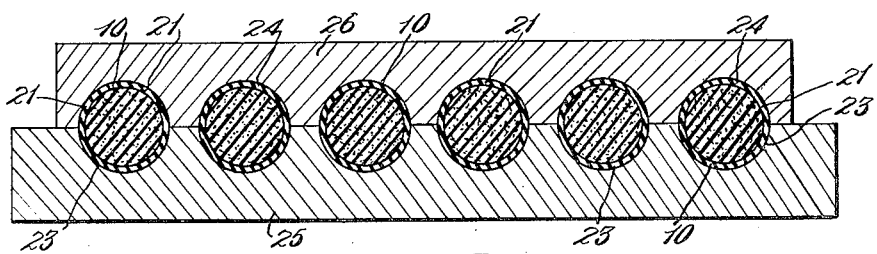
Figure 5 is a sectional view of a mold for curing the cover.
Figure 6:
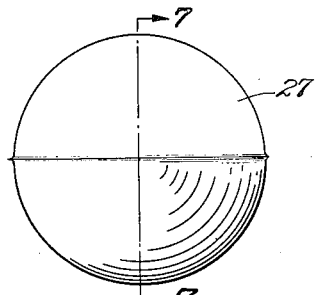
Figure 6 is an elevational view of a completed ball.
Figure 7:
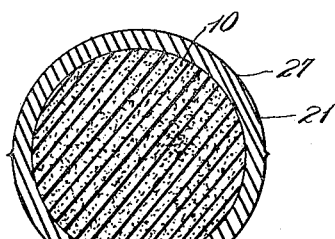
Figure 7 is a cross-sectional view of a completed ball, taken along the line 7—7 of Figure 6.

The sponge rubber core with the uncured cover 21, as shown in Fig. 4, is then placed in cooperating hemispherical recesses 23 and 24 formed in the adjacent surfaces of a lower mold member 25 and an upper mold member 26, these cooperating recesses being of the size of the resultant playing ball. With the balls positioned in the cooperating recesses in the mold members 25 and 26 and the mold members in closed position, as shown in Fig. 5, the cover stock 21 is subjected to a final cure by the application of heat, with the balls under pressure in the mold, which thus vulcanizes the cover to a tough consistency and at the same time forces the cover stock into contact with the cemented surface of the core, thus providing a secure connection between the cover and core. When the ball is removed, any overflow which forms a seam is buffed off to produce a substantially smooth outer surface. In Figs. 6 and 7 is shown the finished ball, which is designated 27, Fig. 6 showing the ball in elevation and Fig. 7 showing it in section. While the balls may be made in any size desired, these figures show the ball in substantially the preferred size.

The important feature of the invention is to provide by this method a ball having a preformed vulcanized sponge rubber core 10 to which is applied a rubber cover of relatively thin solid stock and subsequently vulcanized to a tougher consistency than that of the sponge rubber core 10. This permits a dog to chew the ball without destroying the same, due to the impervious characteristics of the cover stock, and at the same time the sponge rubber core furnishes the necessary resiliency so as not to injure the dog's teeth. It will be understood that while the cover is tough and solid as compared with the core, it is formed of soft rubber stock so that the ball as a whole is of a yielding, elastic nature. Furthermore, it is of great importance that the cover stock be securely united with the sponge rubber core 10, and this, as already explained, is accomplished by means of a suitable adhesive, it being understood that, in the vulcanizing operation for vulcanizing the cover, the two parts of the ball are vulcanized together and integrally united, forming in effect a unitary body. This construction, furthermore, results in a rubber playing ball which is materially lighter than a solid rubber ball of the same size, and, because of its characteristics, the life of the ball is materially lengthened.

While I have described the preferred embodiment of the invention, it is to be understood that I am not to be limited thereto as changes and modifications may be resorted to without departing from the spirit of the invention as defined in the appended claims.

What is claimed is:

1. A play ball for animals such as dogs comprising a substantially uncompressed core of tough, close-grained sponge rubber and a cover which is vulcanized to said core, said cover being of flexible, substantially unstressed vulcanized rubber material of tough consistency thick enough and resilient enough to permit the teeth of the animal to obtain a grip on the ball without danger of penetration of the cover or of injury to the teeth.

2. A play ball for animals such as dogs comprising a substantially uncompressed core of tough, close-grained sponge rubber and a cover which is vulcanized to said core, said cover being of flexible, substantially unstressed vulcanized rubber material of tough consistency, having a thickness of approximately $\frac{1}{10}$ the diameter of said core, sufficient and resilient enough to permit the teeth of the animal to obtain a grip on the ball without danger of penetration of the cover or of injury to the teeth.

RANDOLPH J. DORN.